Sept. 28, 1948.   J. M. HOUSTON   2,450,196
BRAKE SHOE ADJUSTING GAUGE
Filed Feb. 9, 1946

Inventor

John Meridith Houston

By Clarence A. O'Brien
and Harvey B. Jacobson
Attorneys

Patented Sept. 28, 1948

2,450,196

UNITED STATES PATENT OFFICE 2,450,196

BRAKE SHOE ADJUSTING GAUGE

John Meridith Houston, Breckenridge, Tex.

Application February 9, 1946, Serial No. 646,557

1 Claim. (Cl. 33—178)

My invention relates to improvements in brake shoe adjusting gauges and applies particularly to the adjustment of newly relined internal expanding brakes such as are used on automobiles and similar vehicles. The principal object of my invention is to provide a device of the character herein described, whereby the brake shoes after lining, may be easily and accurately adjusted before the brake drum is installed thereon.

A further object of the invention is to provide a brake shoe adjustment gauge which is equally adaptable to brake shoes already in service, and which for some reason have lost their proper adjustment.

A further object of the invention is to provide a brake shoe adjustment gauge which when used, will permit a visual inspection of the adjustment being made. Normally in conventional practice such shoes are obstructed from view by the brake drum, the presence of which is essential in order to make the adjustment.

A further object of the invention is to provide a brake shoe adjustment gauge which is of simple construction and which cannot easily become damaged.

Figure 1:
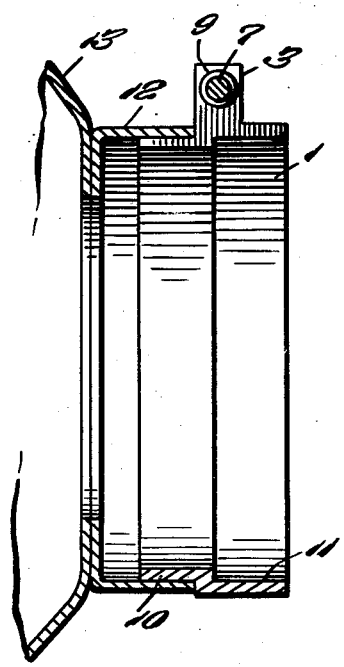
Figure 2:
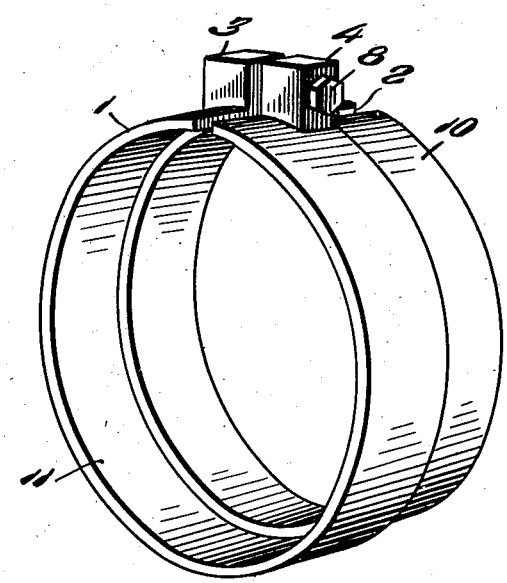
Figure 3:
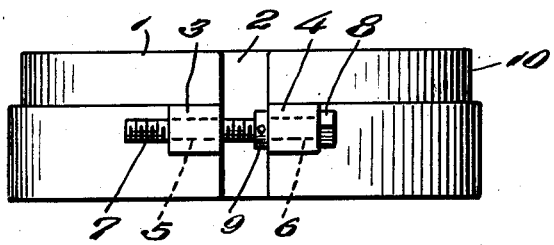

With the above more important objects in view and such other objects as may become apparent as this specification proceeds, my invention consists essentially of the arrangement and construction of parts as illustrated in the accompanying drawings, in which:

Figure 1 is a vertical, cross-sectional elevation of my invention showing the same as applied to a brake drum, Figure 2 is a perspective view of my invention, and Figure 3 is a plan view of the same.

Referring now to the acocmpanying drawings in detail, my invention consists of an open-ended adjusting cylinder 1, longitudinally split along the lateral side thereof as shown at 2. Positioned on the outside surface of the cylinder adjacent the slit edges thereof, I provide a pair of aligned anchor blocks 3 and 4 through which are formed a pair of aligned apertures 5 and 6, respectively.

The aperture 5 is threaded to receive an adjusting screw 7 which is freely rotatable in the aperture 6, with the head 8 thereof bearing against one side of block 4. A suitable collar 9, bearing against the opposite side of this block is secured to the shank of the screw 7, thus preventing the latter from sliding longitudinally in the block 4. It will be observed that rotation of the screw 7 will vary the spacing between the blocks 3 and 4 and thereby increase or decrease the diameter of the associated cylinder 1.

At one end of the cylinder 1 on the outside diameter thereof I provide a male gauging surface 10, while on the inside diameter at the opposite end of the cylinder is a female gauging surface 11.

In order that accurate adjustment may be made, the two aforementioned gauging surfaces should be turned to equal diameter.

When my invention is placed in operation, the male gauging surface 10 is first inserted into the brake drum 12 which is usually secured to a wheel 13. The adjusting screw 7 should now be turned until the surface 10 fits snugly into the drum.

Simultaneously with this operation, the diameter of the female surface 11 has been adjusted to correspond with the diameter of the drum and the cylinder 1 may now be removed and placed with the female surface 11 thereof over the assembled brake shoes, which in turn may be accurately adjusted against the same. In this manner, the conventional procedure of adjusting the brake shoes directly against the drum is eliminated and accurate adjustment may be made with substantially increased convenience.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

A brake shoe gauge comprising a hollow cylindrical body having a longitudinal slot extending throughout the length of the cylinder wall to provide a pair of spaced edges, a pair of opposed anchor blocks fixed on the body adjacent the spaced edges, and an adjustable connector between said blocks, said cylindrical body including a male end portion and a femal end portion, said male end portion including a cylindrical outer surface, said female end portion including a cylindrical inner surface, the outer cylindrical surface of said male end portion and the inner cylindrical surface of said female end portion being co-axial continuations of each other.

JOHN MERIDITH HOUSTON.

REFERENCES CITED

The following references are of record in the file of this patent:

UNITED STATES PATENTS

| Number | Name | Date |
|---|---|---|
| 86,308 | Jones | Jan. 26, 1869 |
| 517,096 | Doll | Mar. 27, 1894 |
| 1,269,932 | Hix | June 18, 1918 |
| 1,381,075 | Louden | June 7, 1921 |
| 1,609,110 | Brown | Nov. 30, 1926 |
| 1,711,724 | Deming | May 7, 1929 |

FOREIGN PATENTS

| Number | Country | Date |
|---|---|---|
| 165,792 | Great Britain | Oct. 4, 1922 |
| 547,834 | Germany | Feb. 28, 1930 |